(12) United States Patent
Cho et al.

(10) Patent No.: US 11,379,783 B2
(45) Date of Patent: Jul. 5, 2022

(54) PACKAGE STORAGE SYSTEM AND METHOD OF CONTROLLING SAME

(71) Applicant: LG ELECTRONICS INC., Seoul (KR)

(72) Inventors: Sungil Cho, Seoul (KR); Zhimin Choo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

(21) Appl. No.: 16/831,250

(22) Filed: Mar. 26, 2020

(65) Prior Publication Data

US 2021/0150456 A1    May 20, 2021

(30) Foreign Application Priority Data

Nov. 19, 2019    (KR) .................. 10-2019-0149029

(51) Int. Cl.
*G06Q 30/00* (2012.01)
*G06Q 10/08* (2012.01)
*G06K 7/10* (2006.01)
*G06K 7/14* (2006.01)

(52) U.S. Cl.
CPC ....... *G06Q 10/083* (2013.01); *G06K 7/10297* (2013.01); *G06K 7/10366* (2013.01); *G06K 7/1413* (2013.01)

(58) Field of Classification Search
CPC ............ G06Q 10/038; G06K 7/10297; G06K 7/10366; G06K 7/1413
USPC ......................................... 705/330
See application file for complete search history.

(56) References Cited

U.S. PATENT DOCUMENTS

| 2019/0329691 | A1* | 10/2019 | Crawford | G05D 1/0291 |
| 2020/0354171 | A1* | 11/2020 | Vincent | B65G 67/08 |
| 2020/0372437 | A1* | 11/2020 | Kim | G06Q 10/08355 |
| 2021/0129917 | A1* | 5/2021 | Sagarsee | B62D 25/2054 |

* cited by examiner

*Primary Examiner* — Ahshik Kim
(74) *Attorney, Agent, or Firm* — KED & Associates LLP

(57) ABSTRACT

A method of controlling a package storage system may include a storage unit that is loaded in a delivery vehicle and stores one or more packages. The method may include: receiving delivery information of the packages from a scanner; storing slot information of slots in which the packages are stored and the delivery information of the packages, in a matched manner; determining, on the basis of the delivery information and driving information of the delivery vehicle, the package to be withdrawn among the packages; and outputting, on the basis of the delivery information and the slot information, a notification command for providing a notification of the slot in which the package to be withdrawn is stored.

18 Claims, 12 Drawing Sheets

PACKAGE STORAGE SYSTEM AND METHOD OF CONTROLLING SAME

CROSS-REFERENCE TO RELATED APPLICATION

The present application claims priority to Korean Patent Application No. 10-2019-0149029, filed on Nov. 19, 2019, the entire contents of which is incorporated herein for all purposes by this reference.

BACKGROUND

1. Field

The present disclosure relates to a package storage system, and a method of controlling the same.

2. Background

As development of intelligent robots has been widely conducted, services that the robots can provide have been gradually expanded. Service spaces of the robots have also expanded from small spaces, such as homes, to large spaces, such as factories, and the like, and from indoors to outdoors.

According to a logistics system, packages stored in warehouses are delivered to recipients via delivery vehicles. Attempts have been made to apply the robots to the entire process of such a logistics system. However, it is practically difficult to apply the robots to the entire process of the logistics system.

BRIEF DESCRIPTION OF THE DRAWINGS

The embodiments will be described in detail with reference to the following drawings in which like reference numerals refer to like elements wherein.

DETAILED DESCRIPTION

Figure 1:
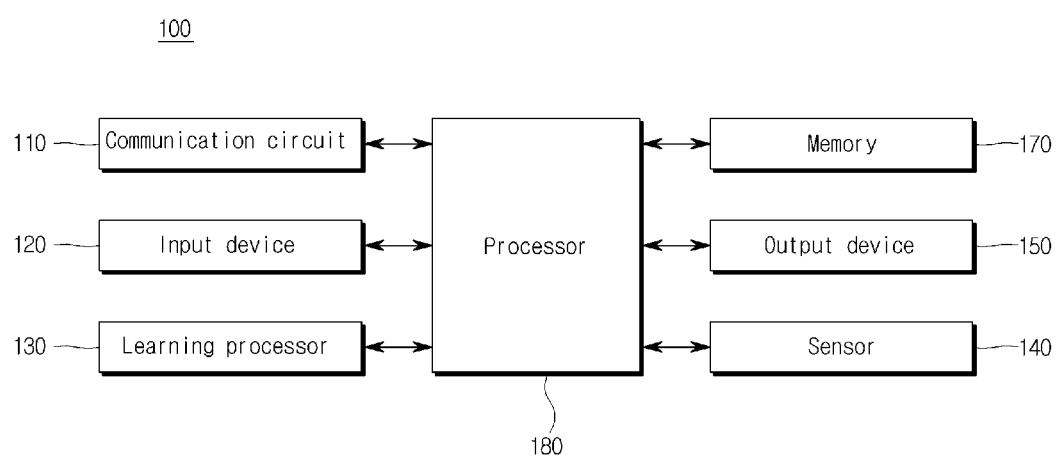
FIG. 1 is a view showing an AI apparatus according to an embodiment of the present disclosure.

Artificial intelligence refers to the field of researching artificial intelligence or the methodology to create the same, and machine learning refers to the field of defining various problems in the field of artificial intelligence and researching the methodology for solving the problems. Machine learning is defined as an algorithm that improves the performance of an operation by performing a consistent experience for the operation.

An artificial neural network (ANN) is a model used in machine learning, configured with artificial neurons (nodes) constituting a network in a synapse coupling, and means a model with problem solving ability. The artificial neural network may be defined by a connection pattern between neurons of other layers, a learning process of updating a model parameter, and an activation function generating an output value.

The artificial neural network may include an input layer, an output layer, and at least one selective hidden layer. Each layer may include at least one neuron, and the artificial neural network may include a synapse that connects neurons. In the artificial neural network, each neuron may output input signals input through a synapse, weights, and a function value of an activation function for a bias.

The model parameter means a parameter determined through learning, and includes a weight of a synapse connection, a bias of a neuron, etc. In addition, a hyper-parameter means a parameter that has to be set before performing learning in a machine learning algorithm, and includes a learning rate, a number of repetition times, a size of a mini-batch, an initialization function, etc.

An objective of performing learning for an artificial neural network is to determine a model parameter that minimizes a loss function. The loss function may be used as an index for determining an optimum model parameter in a learning process of the artificial neural network.

Machine learning may be classified into supervised learning, unsupervised learning, and reinforcement learning according to a learning method. Supervised learning may mean a method of performing learning for an artificial neural network where a label related to learning data is provided, and the label may mean a right answer (or result value) that has to be estimated by the artificial neural network when the learning data is input to the artificial neural network. Unsupervised learning may mean a method of performing learning for an artificial neural network where a label related to learning data is not provided. Reinforcement learning may mean a learning method performing learning so as to select, by an agent defined under a certain environment, an action or an order thereof such that an accumulated reward in each state is maximized.

Machine learning, among artificial neural networks, employed in a deep neural network (DNN) including a plurality of hidden layers, is referred to as deep learning, and the deep learning is a part of the machine learning. Hereinafter, machine learning is used to include deep learning.

A robot may mean a machine capable of automatically carrying out or operating a given operation by its own ability. Particularly, a robot having a function of recognizing an environment, and performing an operation by performing determination by itself may be referred to as an intelligent robot. A robot may be classified into an industrial type, a medical type, a household type, a military type, etc. according to the usage purpose or field.

The robot may be provided with a manipulator including an actuator or a driving device so that the robot may perform various physical operations such as moving a robot joint, and so on. In addition, a movable robot may navigate on the ground or fly in the air by including wheels, brakes and propellers, etc.

Self-driving means the technology of autonomous driving, and a self-driving vehicle means a vehicle that drives without user's manipulations or with the minimum manipulation of the user. For example, self-driving may include the technique of maintaining a driving lane, the technique of automatically adjusting a speed such as adaptive cruise control, the technique of automatically driving along a predetermined route, the technique of automatically setting a route when a destination is set, etc. A self-driving vehicle may be referred to as a robot with a self-driving function.

Vehicles may include a vehicle with only an internal combustion engine, a hybrid vehicle with an internal combustion engine and an electric motor together, and an electric vehicle with only an electric motor, and may include not only automobiles but also trains and motorcycles.

Extended reality refers to virtual reality (VR), augmented reality (AR), and mixed reality (MR). The VR technique provides objects and backgrounds of the real world in CG images, the AR technique provides virtual CG images by reflecting the same on real object images, and the MR technique is a computer graphic technique mixing and coupling virtual objects and providing by reflecting the same in the real word.

The MR technique is similar to the AR technique in that real objects and virtual objects are provided together. In the AR technique, virtual objects are used to complement real objects, but in the MR technique, virtual objects and real objects are equivalently used.

The XR technique may be applied by using a head-mount display (HMD), a head-up display (HUD), a mobile phone, a tablet PC, a laptop PC, a desktop PC, a TV, a digital signage, etc., and a device to which the XR technique is applied may be referred to an XR device.

FIG. 1 is a view showing an AI apparatus according to an embodiment of the present disclosure. The AI apparatus 100 may be employed in a fixed or movable type device such as TVs, projectors, mobile phones, smart phones, desktop PCs, laptop PCs, digital broadcasting terminals, PDAs (personal digital assistants), PMPs (portable multimedia player), navigations, tablet PCs, wearable devices, set-top boxes (STB), DMB receiver, radios, washers, refrigerators, digital signages, robots, vehicles, etc. The AI apparatus 100 may include a communication circuit 110 (or a communication device), an input device 120, a learning processor 130, a sensor 140, an output device 150, a memory 170, and a processor 180.

The communication circuit 110 may transmit and receive data to/from another AI apparatuses (100a to 100e) or external devices such as an AI server 200 by using wired/wireless communication methods. For example, the communication circuit 110 may transmit and receive sensor information, user input, learning model, control signals, etc. to/from external devices.

Herein, communication methods used by the communication circuit 110 include global system for mobile communication (GSM)), code division multi access (CDMA), long term evolution (LTE), 5G, wireless LAN (WLAN), wireless-fidelity (Wi-Fi), Bluetooth™, radio frequency identification (RFID), infrared data association (IrDA), ZigBee, near field communication (NFC), etc.

The input device 120 may be for obtaining various types of data. The input device 120 may include a camera for an image signal input, a microphone for receiving audio signals, and a user input part for receiving information from the user. Herein, signals obtained from the camera or microphone by using the same as sensors may be referred to as sensing data or sensor information.

The input device 120 may be for obtaining input data used for outputting that is performed by using learning data and a learning model for model learning. The input device 120 may be for obtaining input data that is not processed. Herein, the processor 180 or learning processor 130 may obtain an input feature from input data as preprocessing.

The learning processor 130 may perform learning for a model configured with an artificial neural network by using learning data. Herein, the artificial neural network for which learning is performed may be referred to as a learning model. The learning model may be used for estimating a result value for new input data other than learning data, and the estimated value may be used as a reference for performing a certain operation.

The learning processor 130 may perform AI processing with a learning processor 240 of the AI server 200. The learning processor 130 may be integrated in the AI apparatus 100 or may include a memory employed therein. Alternatively, the learning processor 130 may be employed by using the memory 170, an external memory directly connected to the AI apparatus 100, or a memory maintained in an external device.

The sensor 140 may obtain at least one among internal information of the AI apparatus 100, surrounding environmental information of the AI apparatus 100, and user information by using various sensors. The sensor 140 may include a proximity sensor, an ambient light sensor, an acceleration sensor, a magnetic sensor, a gyro sensor, an inertial sensor, an RGB sensor, an IR sensor, a fingerprint recognizing sensor, a ultrasonic sensor, an optical sensor, a microphone, a lidar, a radar, etc.

The output device 150 may generate an output related to visual, auditory, or tactile. The output device 150 may include a display for visually outputting information, a speaker for acoustically outputting information, and a haptic actuator for tactually outputting information. For example, the display may output an image or video, the speaker may output a voice or sound, and the haptic actuator may output vibration.

The memory 170 may be for storing data supporting various functions of the AI apparatus 100. For example, in the memory 170, input data obtained through the input device 120, learning data, a learning model, a learning history, etc. may be stored.

The processor 180 may determine at least one executable operation of the AI apparatus 100 which is determined on the basis of information determined or generated by using a data analysis algorithm or machine learning algorithm. In addition, the processor 180 may perform the determined operation by controlling components of the AI apparatus 100. For the same, the processor 180 may make a request, retrieve, receive, or use data of the learning processor 130 or the memory 170, and control components of the AI apparatus 100 so as to perform the estimated operation of the at least one executable operation, or an operation that is determined to be desirable.

In order to perform the determined operation, the processor 180 may generate, when association with an external device is required, a control signal for controlling the corresponding external device, and transmit the generated control signal to the corresponding external device. The processor 180 may obtain intention information on the user's input, and determine a user's requirement on the basis of the obtained intention information.

The processor 180 may obtain intention information in association with the user's input by using at least one among a STT (speech-to-text) engine converting a voice input into text strings, and a natural language processing (NLP) engine obtaining intention information of natural language.

Herein, a part of the at least one among the STT engine and the NLP engine may be configured with an artificial neural network for which learning is performed according to a machine learning algorithm. In addition, for at least one among the STT engine and the NLP engine, learning may be performed by the learning processor 130, learning may be performed by the learning processor 240 of the AI server 200, or learning may be performed through distribution processing of the above processors.

The processor 180 may collect record information including operation content of the AI apparatus 100 and user's feedback in association with the operation, etc. so as to store in the memory 170 or learning processor 130, or transmit the information to the external device such as an AI server 200, etc. The collected record information may be used when updating a learning model.

The processor 180 may control a part of components of the AI apparatus 100 so as to execute application programs stored in the memory 170. Further, the processor 180 may operate components of the AI apparatus 100 by combining at least two thereof so as to execute the application programs.

Figure 2:
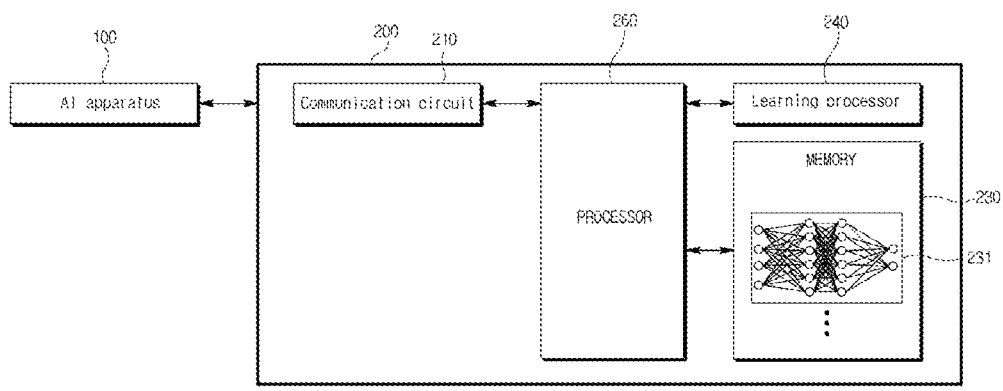
FIG. 2 is a view showing an AI server according to an embodiment of the present disclosure.

FIG. 2 is a view showing an AI server according to an embodiment of the present disclosure. Referring to FIG. 2, an AI server 200 may mean a device performing learning for an artificial neural network by using a machine learning algorithm, or a device using the artificial neural network for which learning is performed. Herein, the AI server 200 may perform distributed processing by being configured with a plurality of servers, or may be defined as a 5G network. Herein, the AI server 200 may perform at least a part of AI processing by being included as a partial component of the AI apparatus 100. The AI server 200 may perform at least a part of AI processing by being included as a partial component of the AI apparatus 100.

The communication circuit 210 (or the communication device) may transmit and receive data to/from the external devices such as AI apparatus 100, etc. The memory 230 may be for storing a model (or artificial neural network, 231) for which learning is ongoing or performed by the learning processor 240.

The learning processor 240 may perform learning for an artificial neural network 231 by using learning data. A learning model may be used by being integrated in the AI server 200 of the artificial neural network, or by being integrated in the external device such as an AI apparatus 100, etc.

The learning model may be employed in hardware, software, or combination thereof. When a part or the entire of the learning model is employed in software, at least one instruction constituting the learning model may be stored in the memory 230.

The processor 260 may estimate a result value for new input data by using the learning model, and generate a response or control command on the basis of the estimated result value.

Figure 3:
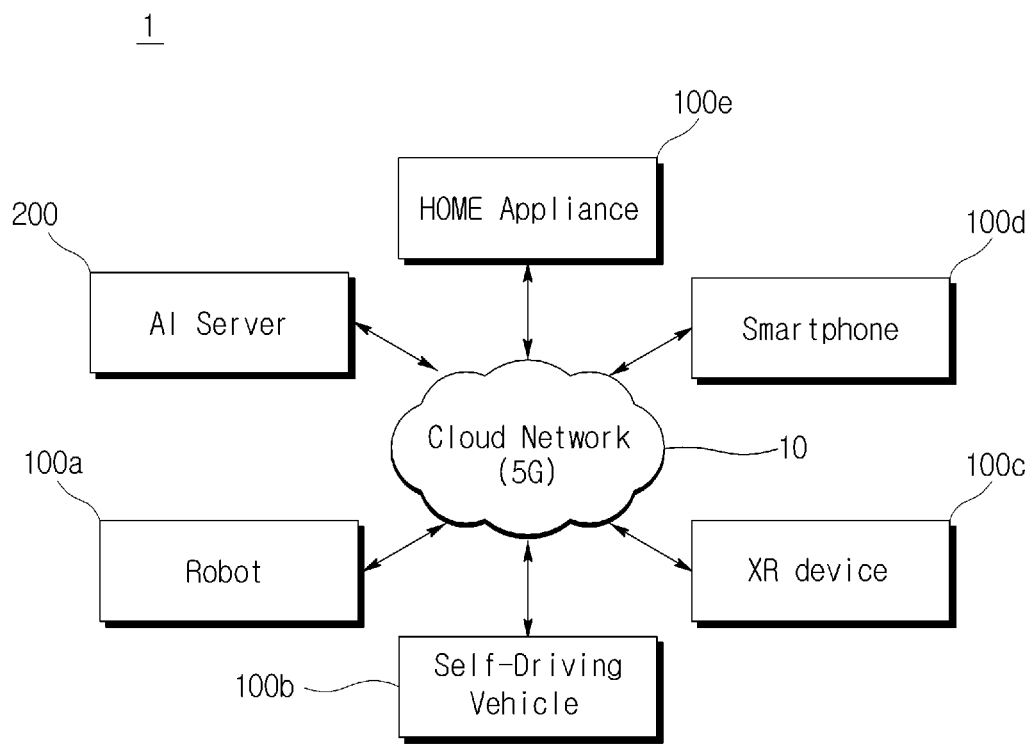
FIG. 3 is a view showing an AI system according to an embodiment of the present disclosure.

FIG. 3 is a view showing an AI system according to an embodiment of the present disclosure. The AI system 1 is connected to at least one cloud network 10 among the AI server 200, a robot 100a, self-driving vehicle 100b, an XR device 100c, a smart phone 100d, and a home appliance 100e. Herein, the robot 100a, the self-driving vehicle 100b, the XR device 100c, the smart phone 100d or the home appliance 100e to which the AI technique is applied may be referred to as the AI apparatus (100a to 100e).

The cloud network 10 may mean a network constituting a part of cloud computing infrastructure or a network present in the cloud computing infrastructure. Herein, the cloud network 10 may be configured by using a 3G network, a 4G or LTE network, a 5G network, etc.

In other words, each device (100a to 100e, 200) constituting the AI system 1 may be connected with each other through the cloud network 10. Particularly, each device (100a to 100e, 200) may perform communication with each other through a base station, and also may perform direct communication without using the base station.

The AI server 200 may include a server performing AI processing, and a server performing calculation for big data. The AI server 200 may be connected to at least one of AI apparatus constituting an AI system 1 configured with the robot 100a, the self-driving vehicle 100b, the XR device 100c, the smart phone 100d, and the home appliance 100e through the cloud network 10, and the AI server 200 may support a part of the AI processing of the connected AI apparatuses (100a to 100e).

Herein, the AI server 200 may perform learning on an artificial neural network according to a machine learning algorithm in place of the AI apparatus (100a to 100e), may directly store a learning model, or transmit the learning model to the AI apparatus (100a to 100e). The AI server 200 may receive input data from the AI apparatus (100a to 100e), estimate a result value for the received input data by using a learning model, and generate a response or control command on the basis of the estimated result value so as to transmit the same to the AI apparatus (100a to 100e).

Alternatively, the AI apparatus (100a to 100e) may estimate a result value for the received input data by directly using a learning model, and generate a response or control command on the basis of the estimated result value.

Various examples of the AI apparatus (100a to 100e) to which the above described technique is applied will be described. The AI apparatus (100a to 100e) shown in FIG. 3 may be referred to a detailed example of the AI apparatus 100 shown in FIG. 1.

The robot 100a may be employed as a guide robot, a transport robot, a cleaning robot, a wearable robot, an entertainment robot, a pet robot, an unmanned flying robot, etc. by applying the AI technique thereto. The robot 100a may include a robot control module for controlling operations, and the robot control module may mean a software module or a chip where the same is employed therein.

The robot 100a may obtain state information of the robot 100a, detect (recognize) a surrounding environment or objects, generate map data, determine a moving path or driving plan, determine a response in association with a user interaction, or determine operations by using sensor information that is obtained through various types of sensors.

In order to determine a moving path or driving plan, the robot 100a may use sensor information obtained by using at least one sensor of a lidar, a radar, and a camera.

The robot 100a may perform the above operations by using a learning model configured with at least one artificial neural network. For example, the robot 100a may recognize a surrounding environment and objects by using a learning model, and determine operations by using the recognized surrounding environment information or object information. Herein, the learning model may be obtained by directly performing learning by the robot 100a, or by performing learning by the external device such as an AI server 200, etc.

The robot 100a may generate a result by directly using the learning model so as to perform operations. However, the robot 100a may transmit the sensor information to the external device such as an AI server 200, and receive a result generated according thereto so as to perform operations.

The robot 100a may determine a moving path and a driving plan by using at least one among map data, object information detected from the sensor information, and object information obtained from the external device, and drive according to the determined moving path and the driving plan by controlling a driving part.

Map data may include object slot information on various objects arranged in a space where the robot 100a moves. For example, the map data may include object slot information on fixed objects such as walls, doors, etc., and movable objects such as flowerpots, tables, etc. In addition, the object slot information may include a name, a type, a distance, a position, etc.

In addition, the robot 100a may perform operations or drive by controlling the driving part on the basis of the user's control/interaction. Herein, the robot 100a may obtain intention information on interaction according to a user's behavior or voice input, and determine a response on the basis of the obtained intention information so as to perform operations.

The self-driving vehicle 100b may be employed as a movable robot, a vehicle, an unmanned flying robot, etc. by applying the AI technique thereto. The self-driving vehicle 100b may include a self-driving control module controlling a self-driving function, and the self-driving control module may mean a software module or a chip where the same is employed in hardware. The self-driving control module may be included in the self-driving vehicle 100b as a component thereof, but may be connected to the self-driving vehicle 100b by being configured in separate hardware.

The self-driving vehicle 100b may obtain state information of the self-driving vehicle 100b, detect (recognize) a surrounding environment and objects, generate map data, determine a moving path and a driving plan, or determine operations by using sensor information obtained through various types of sensors.

In order to determine a moving path or driving plan, the self-driving vehicle 100b, similar to the robot 100a, may use sensor information obtained by using at least one sensor of a lidar, a radar, and a camera.

Particularly, the self-driving vehicle 100b may recognize an environment and objects for areas that are hidden from view or over a certain distance by receiving sensor information from external devices, or by receiving information directly recognized from the external devices.

The self-driving vehicle 100b may perform the above operations by using a learning model configured with at least one artificial neural network. For example, the self-driving vehicle 100b may recognize a surrounding environment and objects by using a learning model, and determine a driving path by using the recognized surrounding environment information or object information. Herein, the learning model may be obtained by directly performing learning by the self-driving vehicle 100b, or by performing learning by the external device such as an AI server 200, etc.

Herein, the self-driving vehicle 100b may generate a result by directly using the learning model so as to perform operations. However, the self-driving vehicle 100b may transmit the sensor information to the external device such as an AI server 200, and receive a result generated according thereto so as to perform operations.

The self-driving vehicle 100b may determine a moving path and a driving plan by using at least one among map data, object information detected from the sensor information, and object information obtained from the external device, and drive according to the determined moving path and the driving plan by controlling a driving part.

Map data may include object slot information on various objects (for example, roads) arranged in a space where the self-driving vehicle 100b drives. For example, the map data may include object slot information on fixed objects such as street lamps, rocks, buildings, etc. and movable objects such as vehicles, pedestrians, etc. In addition, the object slot information may include a name, a type, a distance, a position, etc.

In addition, the self-driving vehicle 100b may perform operations or drive by controlling the driving part on the basis of the user's control/interaction. Herein, the self-driving vehicle 100b may obtain intention information on interaction according to a user's behavior or voice input, and determine a response on the basis of the obtained intention information so as to perform operations.

The XR device 100c may be employed by using a HMD, a HUD provided in a vehicle, a TV, a mobile phone, a smart phone, a PC, a wearable device, a home appliance, a digital signage, a vehicle, or a fixed type robot or movable type robot.

The XR device 100c analyze 3D point cloud data or image data which is obtained through various sensors or external devices, generate position data and feature data on 3D points, and obtain information on a surrounding space and real objects and output XR objects to be rendered. For example, the XR device 100c may output XR objects including additional information on the recognized objects by reflecting the same in the corresponding recognized objects.

The XR device 100c may perform the above operations by using a learning model configured with at least one artificial neural network. For example, the XR device 100c may recognize real objects from 3D point cloud data or image data by using a learning model, and provide information in association with the recognized real objects. Herein, the learning model may be obtained by directly performing learning by the XR device 100c, or by performing learning by the external device such as an AI server 200, etc.

The XR device 100c may generate a result by directly using the learning model so as to perform operations. However, the XR device 100c may transmit the sensor information to the external device such as an AI server 200, and receive a result generated according thereto so as to perform operations.

The robot 100a may be employed as a guide robot, a transport robot, a cleaning robot, a wearable robot, an entertainment robot, a pet robot, an unmanned flying robot, etc. by applying the AI technique and the self-driving technique thereto. The robot 100a to which the AI technique and the self-driving technique are applied may mean a robot itself with a self-driving function, or the robot 100a operating in conjunction with the self-driving vehicle 100b. The robot 100a with the self-driving function may refer to all devices moving by itself according to a given movement, or by determining a moving path by itself without a user control.

The robot 100a and the self-driving vehicle 100b which respectively have self-driving functions may use a common sensing method for determining at least one among a moving path and a driving plan. For example, the robot 100a and the self-driving vehicle 100b which respectively have self-driving functions may determine a moving path or driving plan by using information sensed through a lidar, a radar, a camera, etc.

The robot 100a operating in conjunction with the self-driving vehicle 100b may be present separate from the self-driving vehicle 100b, while the robot 100a is internally or externally connected to the self-driving function of the self-driving vehicle 100b, or may perform operations in association with the driver of the self-driving vehicle 100b.

Herein, the robot 100a operating in conjunction with the self-driving vehicle 100b may obtain sensor information in place of the self-driving vehicle 100b so as to provide the information to the self-driving vehicle 100b, or obtain sensor information and generate surrounding environment information or object information so as to provide the information to the self-driving vehicle 100b, and thus control or supplement the self-driving function of the self-driving vehicle 100b.

Alternatively, the robot 100a operating in conjunction with the self-driving vehicle 100b may monitor a driver of the self-driving vehicle 100b, or control functions of the self-driving vehicle 100b by operating in conjunction with the driver. For example, when it is determined that the driver is drowsy, the robot 100a may activate the self-driving function of the self-driving vehicle 100b or control the driving part of the self-driving vehicle 100b. Herein, functions of the self-driving vehicle 100b which are controlled by the robot 100a include, in addition to the self-driving function, functions provided from a navigation system or audio system provided in the self-driving vehicle 100b.

Alternatively, the robot 100a operating in conjunction with the self-driving vehicle 100b may provide information or supplement functions of the self-driving vehicle 100b from the outside of the self-driving vehicle 100b. For example, the robot 100a may provide traffic information including signal information such as smart signals to the self-driving vehicle 100b, or may automatically connect to an electrical charging device such as an automatic electric charger of an electric vehicle by operating in conjunction with the self-driving vehicle 100b.

The robot 100a may be employed as a guide robot, a transport robot, a cleaning robot, a wearable robot, an entertainment robot, a pet robot, an unmanned flying robot, a drone, etc. by applying the AI technique and the XR technique thereto.

The robot 100a to which the XR technique is applied may mean a robot that becomes a target controlled/operated within an XR image. Herein, the robot 100a may be distinguished from the XR device 100c and operate in conjunction with the same.

For the robot 100a that becomes a target controlled/operated within an XR image, when sensor information is obtained from sensors including a camera, the robot 100a or the XR device 100c may generate an XR image on the basis of the sensor information, and the XR device 100c may output the generated XR image. In addition, the above robot 100a may operate on the basis of a control signal input through the XR device 100c, or in conjunction with the user.

For example, the user may check an XR image in association with a view of the robot 100a that is in conjunction with the external device such as XR device 100c in a remote manner, adjust a self-driving path of the robot 100a through in conjunction with the robot 100a, control operations or driving, or check information on surrounding objects.

The self-driving vehicle 100b may be employed as a movable robot, a vehicle, an unmanned flying robot, etc. by applying the AI technique and the XR technique thereto. The self-driving vehicle 100b to which the XR technique is applied may mean self-driving vehicle provided with a device providing an XR image, and self-driving vehicle that becomes a target controlled/operated within an XR image, etc. Particularly, the self-driving vehicle 100b that becomes a target controlled/operated within an XR image may be distinguished from the XR device 100c, and operate in conjunction with the same.

The self-driving vehicle 100b provided with a device providing an XR image may obtain sensor information from sensors including a camera, and output an XR image generated on the basis of the obtained sensor information. For example, the self-driving vehicle 100b outputs an XR image by using a HUD, and thus provides to a passenger a real object or XR object in association with objects within a screen.

Herein, when the XR object is displayed on the HUD, at least a part of the XR object may be displayed to overlap the real object to which the passenger's eyes are directed. On the other hand, when the XR object displayed on a display included in the self-driving vehicle 100b, at least a part of the XR object may be displayed to overlap an object within the screen. For example, the self-driving vehicle 100b may output XR objects in association with carriageways, other vehicles, signals, traffic signs, motorcycles, pedestrians, buildings, etc.

For the self-driving vehicle 100b that becomes a target controlled/operated within an XR image, when sensor information is obtained from sensors including a camera, the self-driving vehicle 100b or XR device 100c may generate an XR image on the basis of the sensor information, and the XR device 100c may output the generated XR image. In addition, the above self-driving vehicle 100b may operate on the basis of a control signal input through the external device such as XR device 100c, etc. or in conjunction with the user.

Figure 4:
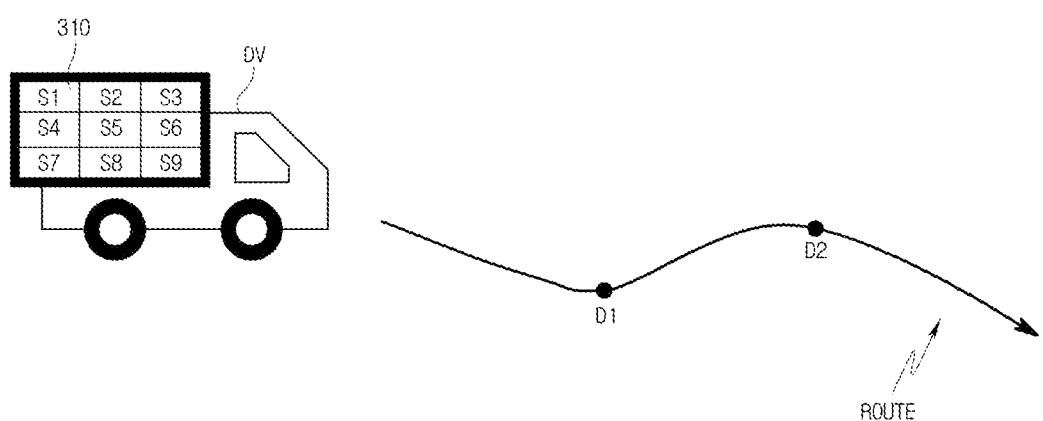
FIG. 4 is a view showing a storage unit according to embodiments of the present disclosure.

FIG. 4 is a view showing a storage unit according to embodiments of the present disclosure. A storage unit 310 (also referred to as storage) refers to a device in which a package to be delivered is stored. According to embodiments, the storage unit 310 may have a structure such as a locker, a rack, a tray, a shelf, or the like, but it is not limited thereto.

The storage unit 310 may include multiple slots S1 to S9 (or plurality of slots). The multiple slots S1 to S9 may hold packages therein, respectively, and may be physically divided. According to embodiments, the multiple slots S1 to S9 may be completely or partially separated from each other via walls, partitions, or the like. Each of the multiple slots S1 to S9 may include a door capable of being opened and closed, but it is not limited thereto.

In the meantime, although only nine slots are shown in FIG. 4, embodiments of the present disclosure are not limited thereto.

The storage unit 310 may be loaded in a delivery vehicle DV. The delivery vehicle DV may be a means of transporting a package to deliver the package. According to embodiments, the delivery vehicle DV may be a vehicle, an airplane, a ship, or a drone that is operated by user's manipulation. In addition, the delivery vehicle DV may be a self-driving vehicle or a robot (for example, which is described with reference to FIGS. 1 to 3) in which user's manipulation is not partially required, and without being limited thereto, the delivery vehicle DV may be a ship, a drone, a delivery robot, an airplane, and the like.

Loading the storage unit 310, the delivery vehicle DV may drive along a driving path ROUTE. According to embodiments, when the delivery vehicle DV arrives at destinations D1 and D2 on the driving path ROUTE, the package stored in the storage unit 310 is withdrawn from the storage unit 310 and is delivered to a delivery destination.

Figure 5:
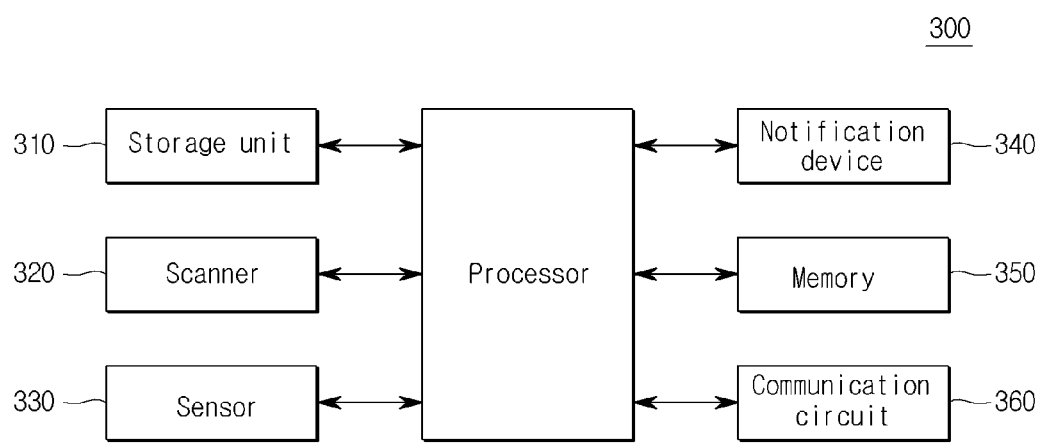
FIG. 5 is a view showing a package storage system according to embodiments of the present disclosure.

FIG. 5 is a view showing a package storage system according to embodiments of the present disclosure. A package storage system 300 may include the storage unit 310, a scanner 320, a sensor 330, a notification device 340, a memory 350, a communication circuit 360 (or a communication device), and a processor 370 (also referred to as a hardware processor).

The storage unit 310 may hold a package therein. The storage unit 310 may be loaded in the delivery vehicle, and may hold the package therein which is to be delivered by the delivery vehicle.

The scanner 320 may scan the package to be delivered, and may read delivery information of the package to be delivered, according to a result of the scanning. According to embodiments, the scanner 320 may scan a tag or an invoice included in the package to be delivered.

The scanner 320 may perform scanning according to an optical or electromagnetic method. For example, the scanner 320 may be implemented as a device performing the function of any one among a camera, an optical scanner, a barcode reader, a radio-frequency identification (RFID) reader, and a near field communication (NFC) reader, but it is not limited thereto.

The sensor 330 may detect a state of the storage unit 310, and may generate detection data. According to embodiments, the sensor 330 may generate the detection data that is used to identify the slot in which the package is held, among the slots of the storage unit 310. According to embodiments, the sensor 330 may perform detection on the storage unit 310 at a first time point and may then generate first detection data. The sensor 330 may perform detection on the storage unit 310 at a second time point after the first time point and may then generate second detection data.

The sensor 330 may include an image sensor that acquires an image of the storage unit 310. According to embodiments, the camera may photograph the storage unit 310 and generate an image of the storage unit 310. For example, the camera may photograph the storage unit 310 at the first time point to generate a first image, and may photograph the storage unit 310 at the second time point to generate a second image. Herein, the first time point may be a point in time preceding the second time point.

The sensor 330 may include a weight sensor measuring the weights inside the slots of the storage unit 310. According to embodiments, the weight sensor may measure the weight inside each of the slots of the storage unit 310, and may generate data of the measured weight. For example, the weight sensor may measure the weights inside the slots of the storage unit 310 at the first time point to generate first weight data. The weight sensor may measure the weights inside the slots of the storage unit 310 at the second time point to generate second weight data.

The sensor 330 may include a proximity sensor detecting the presence of an object (for example, a package) in the slot of the storage unit 310. According to embodiments, the proximity sensor may detect the presence of an object in the slots of the storage unit 310, and may generate detection data according to a result of the detection. The proximity sensor may be provided at the slot, and the detection data may be data indicating whether an object is present within a reference distance from the proximity sensor. For example, the proximity sensor may detect the presence of an object in the slots of the storage unit 310 at the first time point to generate first detection data. The proximity sensor may detect the presence of an object in the slots of the storage unit 310 at the second time point to generate second detection data.

The notification device 340 may provide information on the slot in which the package to be delivered is held. According to embodiments, the notification device 340 may provide the information visually or audibly. For example, the notification device 340 may be any one among a display device, a lamp, and a speaker.

In the case where the notification device 340 is a display device, the display device may display the image of the storage unit 310 and may emphasize a portion with respect to the slot holding the package to be delivered therein, on the image. Further, the display device may display the position or the identification number (for example, a slot number) of the slot in which the package to be delivered is held.

In the case where the notification device 340 is a lamp, multiple lamps may be provided at the respective slots of the storage unit 310, and the lamp among the multiple lamps which is provided at the slot storing the package to be delivered may emit light (or turn on).

In the case where the notification device 340 is a speaker, the speaker may output sound for informing of the position or the identification number (for example, a slot number) of the slot in which the package to be delivered is held.

The memory 350 may store data required for the operation of the package storage system 300. According to embodiments, the memory 350 may store the delivery information of the package and slot information for identifying each of the slots of the storage unit 310.

The delivery information is information for identifying the package to be delivered, and may include information on the delivery destination of the package. According to embodiments, the delivery information may further include information on a name of a package, a sender of a package, an origin of a package, a recipient of a package, a type of package, a characteristic of a package, or the like.

The slot information is information for identifying the slots, and may include at least one among an ID of the slot and position information of the slot (for example, coordinates of the slot) in the storage unit 310.

For example, the memory 350 may include at least one among a volatile memory and a volatile memory.

The communication circuit 360 may transmit and receive data to/from the external devices. According to embodiments, the communication circuit 360 may transmit and receive data to/from the external devices by using a wireless network or a wired network. The data may refer to any data required for the operation of the package storage system 300.

According to embodiments, the communication circuit 360 may receive data for the vehicle in which the storage unit 310 is loaded. For example, the communication circuit 360 may receive driving information that includes the current position and the driving path of the vehicle in which the storage unit 310 is loaded.

The processor 370 may control the overall operations of the package storage system 300. According to embodiments, the processor 370 may be hardware having calculation processing capabilities. For example, the processor 370 may include an integrated circuit, a central processing unit (CPU), a micro controller unit (MCU), a graphic processing unit (GPU), or an application specific integrated circuit (ASIC), but it is not limited thereto.

According to embodiments, the processor 370 may be implemented into independent hardware (for example, a control device). In this case, the processor 370 may control other elements of the package storage system 300 over the wired network or the wireless network.

The processor 370 may control opening and closing of the storage unit 310. According to embodiments, the processor 370 may open the slot in which the package to be delivered is stored, among the slots of the storage unit 310.

The processor 370 may receive the delivery information of the package which is read by the scanner 320, and may store the delivery information in the memory 350. According to embodiments, the processor 370 may receive the delivery information from the scanner 320.

The processor 370 may identify the slot in which the package is stored among the slots of the storage unit 310, by using the detection data generated by the sensor 330. According to embodiments, the processor 370 may identify the slot in which the package corresponding to the delivery information read by the scanner 320 is stored, among the slots of the storage unit 310. For example, the processor 370 may identify the slot in which the package is stored, by using the detection data that is generated after reading with respect to the package by the scanner 320.

In the case where the sensor 330 includes the image sensor, the processor 370 may identify the slot in which the package is stored among the slots of the storage unit 310, by using the image of the storage unit 310.

According to embodiments, the processor 370 may analyze the image of the storage unit 310, recognize an operation of inserting the package, and identify the slot into which the package is inserted, through the recognition.

According to embodiments, the processor 370 may compare the first image of the storage unit 310, which is acquired at the first time point, and the second image of the storage unit 310, which is acquired at the second time point, and may identify the slot in which the package is stored, according to a result of the comparison. For example, the processor 370 may identify the slot corresponding to a portion in which the difference between the first image and the second image exceeds a reference difference, as the slot in which the package is stored, among the slots of the storage unit 310.

In the case where the sensor 330 is the weight sensor, the processor 370 may identify the slot in which the package is stored, among the slots of the storage unit 310, by using the weights inside the slots of the storage unit 310.

According to embodiments, the processor 370 may identify the slot in which the measured weight exceeds a reference weight, as the slot in which the package is stored, among the slots of the storage unit 310. The reference weight may be determined for each of the slots.

According to embodiments, the processor 370 may compare first weights of the respective slots of the storage unit 310 which are measured at the first time point and second weights of the respective slots of the storage unit 310 which are measured at the second time point, and may identify the slot in which the package is stored, according to a result of the comparison. For example, the processor 370 may identify the slot in which the difference between the first weight and the second weight exceeds a reference difference, as the slot in which the package is stored, among the slots of the storage unit 310. Further, the processor 370 may identify, as the slot in which the package is stored, the slot in which the second weight is greater than the first weight (in other words, when the weight is increased).

In the case where the sensor 330 includes the proximity sensor, the processor 370 may identify, on the basis of the presence of an object inside the slots of the storage unit 310, the slot in which the package is stored.

According to embodiments, the processor 370 may identify the slot in which it is detected that an object is present, as the slot in which the package is stored, among the slots of the storage unit 310.

According to embodiments, the processor 370 may compare first detection data of the respective slots of the storage unit 310 which is measured by the proximity sensor at the first time point and second detection data of the respective slots of the storage unit 310 which is measured by the proximity sensor at the second time point, and may identify the slot in which the package is stored, according to a result of the comparison. For example, the processor 370 may identify, as the slot in which the package is stored, among the slots of the storage unit 310, the slot in which the first detection data indicates the absence of the package and the second detection data indicates the presence of the package.

The processor 370 may control the notification device 340. According to embodiments, the processor 370 may control the notification device 340 so that the notification device 340 provides a notification of the slots in which packages are stored, among the slots of the storage unit 310. In addition, the processor 370 may control the notification device 340 so that the notification device 340 provides a notification of the slot in which the package to be withdrawn is stored, among the slots in which the packages are stored.

According to embodiments, the processor 370 may determine, on the basis of the delivery information of the packages and the driving information of the delivery vehicle DV, the package to be delivered among the packages stored in the storage unit 310, and may control the notification device 340 so that the notification device 340 provides the notification of the slot in which the determined package is stored. The driving information may include the current position of the delivery vehicle DV, the driving path of the delivery vehicle DV, and a list of destinations of the delivery vehicle DV, but it is not limited thereto.

The processor 370 may control the communication circuit 360 to transmit and receive data. According to embodiments, the processor 370 may transmit data through the communication circuit 360, and may receive data through the communication circuit 360.

Figure 6:
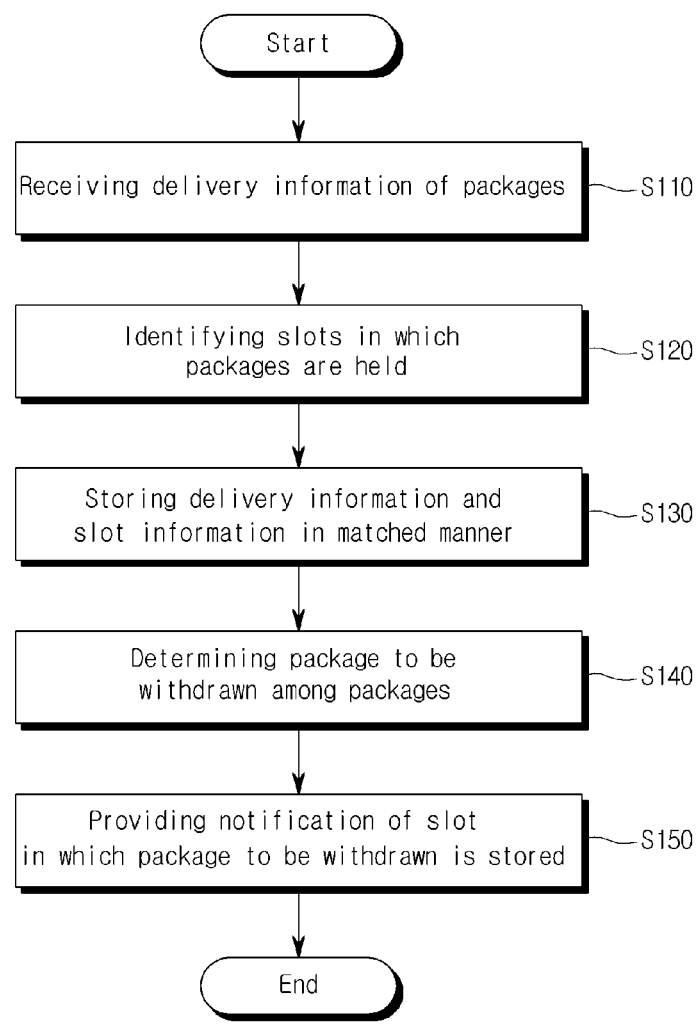
FIG. 6 is a flowchart showing a method of controlling a package storage system according to embodiments of the present disclosure.

FIG. 6 is a flowchart showing a method of controlling a package storage system according to embodiments of the present disclosure. The method shown in FIG. 6 may be performed by the processor 370 of the package storage system 300. In addition, the method may be implemented by instructions executable by a computer. The instructions may be stored in a computer readable storage medium.

The processor 370 may receive delivery information of packages at step S110. According to embodiments, the processor 370 may receive the delivery information of the package which is read by the scanner 320.

Before receiving the delivery information, the processor 370 may perform authentication for a user of the package storage system 300. After the authentication is completed, the processor 370 may receive the delivery information of the packages.

The processor 370 may identify, among the multiple slots, the slots in which the packages are held, at step S120. According to embodiments, the processor 370 may receive the detection data generated by the sensor 330, and may identify the slots in which the packages are stored, among the multiple slots, by using the detection data.

According to embodiments, the processor 370 may identify, among the multiple slots, the slot in which the package corresponding to the received delivery information is stored. For example, in the case where first delivery information of a first package is read and the first package is stored in the storage unit 310, the processor 370 may identify, among the multiple slots, the slot in which the first package is stored.

The processor 370 may match the delivery information of the package with the slot information and may store a result of the matching, at step S130. According to embodiments, the processor 370 may match the delivery information of the package with the slot information of the slot that is identified as storing the package, and may store a result of the matching in the memory 350. For example, the processor 370 may store the delivery information of the package as an index of the slot information or may store the slot information as an index of the delivery information of the package.

That is, the processor 370 may store the delivery information of the package and the slot information of the slot in association with each other so that the delivery information of the package is used to find the slot information of the slot in which the package is stored or the slot information is used to find the delivery information of the package stored in the slot. According to embodiments, the delivery information of the package and the slot information of the slot may be matched with each other and stored in the memory 350 in the form of a table.

The processor 370 may determine the package to be withdrawn, among the packages stored in the storage unit 310, at step S140. According to embodiments, the processor 370 may determine the package to be withdrawn (product to be withdrawn) among the stored packages, by using the driving information of the delivery vehicle DV and the delivery information of the package. According to embodiments, the processor 370 may determine, as the package to be withdrawn, the package having the delivery destination that is located within a reference range from the current position of the delivery vehicle DV, among the packages stored in the storage unit 310.

According to embodiments, the processor 370 may determine, as the package to be withdrawn, the package having the delivery destination corresponding to the destination of the delivery vehicle DV, among the packages stored in the storage unit 310. According to embodiments, the processor 370 may determine, as the package to be withdrawn, the package having the delivery destination that is located within a reference range from the driving path of the delivery vehicle DV, among the packages stored in the storage unit 310.

According to embodiments, the processor 370 may determine, as the package to be withdrawn, the package in which an estimated arrival time to the delivery destination is within a reference time, among the packages stored in the storage unit 310. The processor 370 may calculate the estimated arrival time to the delivery destination, on the basis of the driving information and the delivery information.

The processor 370 may provide a notification of the slot in which the package to be withdrawn is stored, at step S150. According to embodiments, the processor 370 may determine the slot in which the package to be withdrawn is stored, among the slots, and may control the notification device 340 so that the notification device 340 provides the notification of the slot in which the package to be withdrawn is stored. For example, the processor 370 may transmit, to the notification device 340, a notification command including information on the slot in which the package to be withdrawn is stored.

According to embodiments, the processor 370 may determine, on the basis of the delivery information of the package and the slot information of the slot which are matched with each other and stored, the slot in which the package to be withdrawn is stored, among the multiple slots, and may transmit the notification command including the information on the slot in which the package to be withdrawn is stored, to the notification device 340. For example, the processor 370 may read the table stored in the memory 350, and may read, from the table, the delivery information of the package and the slot information of the slot which are matched with each other and stored.

In the case where there are multiple packages to be withdrawn (for example, the delivery destinations are the same), the processor 370 may determine the notification sequence of the multiple packages to be withdrawn. According to embodiments, in the case of the multiple packages to be withdrawn, the processor 370 may determine several packages among the multiple packages to be withdrawn, and may sequentially provide the notification commands for the slots in which the determined several packages are stored.

According to embodiments, the processor 370 may determine one or several packages among the multiple packages to be withdrawn, on the basis of the characteristic of the delivery destination, the weight of the package, and the size of the package. For example, the processor 370 may preferentially select, among the multiple packages to be withdrawn, one or several packages of which the delivery destination is equal to or higher than a reference floor, of which the size is equal to or greater than a reference size, or of which the weight is equal to or lighter than a reference weight. Further, for example, the processor 370 may perform the selection in such a manner that the total weight of the selected packages to be withdrawn does not exceed a reference weight.

The notification device 340 may provide a notification of the slot in which the package to be withdrawn is stored, according to control by the processor 370. According to embodiments, the notification device 340 may sequentially provide notifications of the slots, according to control by the processor 370.

When the withdrawal of the package is completed, the processor 370 deletes the stored delivery information that is matched with the slot information. That is, the delivery information matched with the slot information of the slot in which the withdrawn package was stored is not present anymore.

According to embodiments, the processor 370 may identify the slot from which the package is withdrawn, among the slots of the storage unit 310, by using the detection data generated by the sensor 330. Identifying the slot from which the package is withdrawn may be performed by a method that is substantially similar to the method of identifying the slot in which the package is stored.

For example, the processor 370 may analyze the image of the storage unit 310, recognize an operation of withdrawing the package, and identify the slot from which the package is withdrawn, through the recognition.

For example, the processor 370 may compare the first image of the storage unit 310, which is acquired at the first time point, and the second image of the storage unit 310, which is acquired at the second time point, and may identify the slot in which the package is stored, according to a result of the comparison.

For example, the processor 370 may identify the slot (in other words, the slot of which the weight is decreased) of which the second weight is lighter than the first weight, as the slot from which the package is withdrawn, among the slots of the storage unit 310.

For example, the processor 370 may identify, as the slot from which the package is withdrawn, among the slots of the storage unit 310, the slot in which the first detection data indicates the presence of the package and the second detection data indicates the absence of the package.

According to embodiments of the present disclosure, a notification of the slot in which the package to be withdrawn, among the packages stored in the storage unit 310, is stored is automatically provided, thereby facilitating the withdrawal of the stored packages. For example, even though packages are randomly placed in the storage unit 310, the notification of the slot in which the package to be withdrawn is placed is automatically provided, according to embodiments of the present disclosure. Thus, the worker who withdraws the package can easily identify the package to be withdrawn through the notification, thereby enhancing the efficiency of the withdrawal operation.

Figure 7:
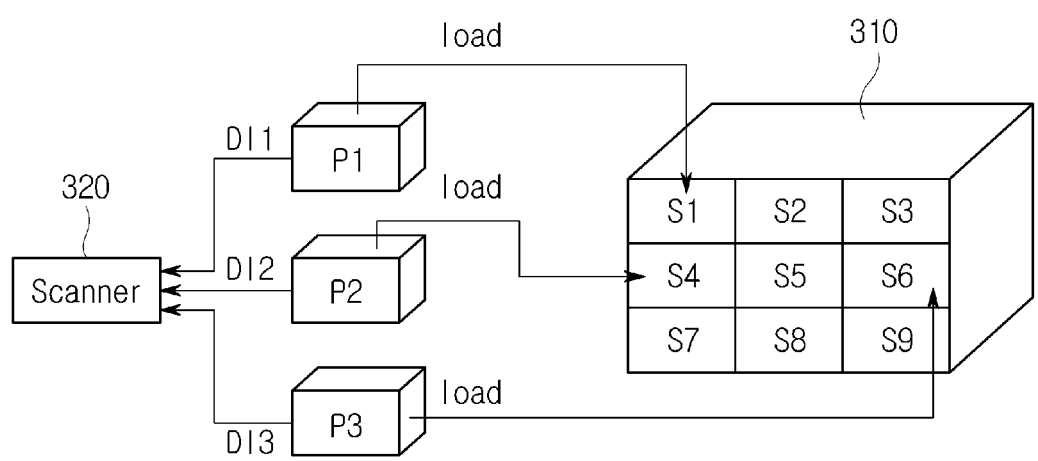
FIGS. 7 to 9 are views showing operation of another package storage system according to embodiments of the present disclosure.
Figure 8:
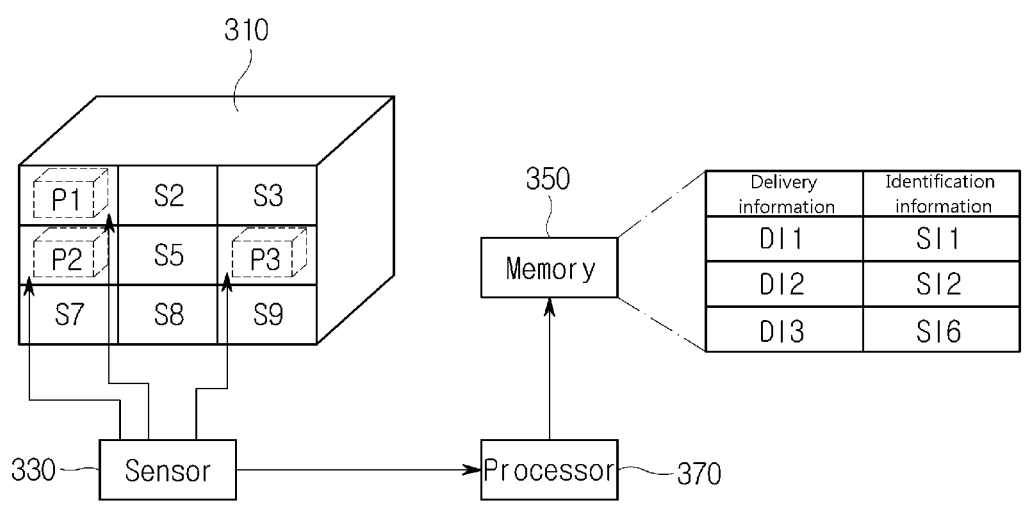
Figure 9:
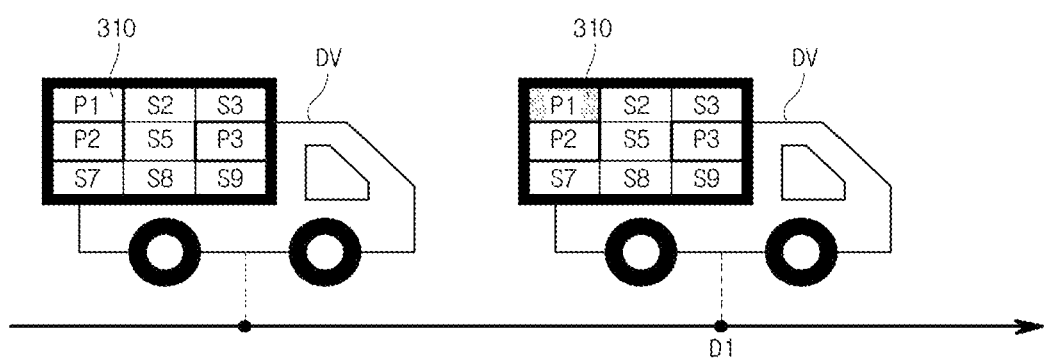

FIGS. 7 to 9 are views showing operation of another package storage system according to embodiments of the present disclosure. Referring to FIG. 7, delivery information DI1 to DI3 of the respective packages P1 to P3 to be delivered are read by the scanner 320. The read delivery information DI1 to DI3 may be transmitted to the processor 370. The processor 370 may receive the delivery information DI1 to DI3, and may store the received delivery information DI1 to DI3 in the memory 350.

After scanning, the packages P1 to P3 may be stored in the storage unit 310. According to embodiments, the packages P1 to P3 may be sequentially scanned and stored. For example, a first package P1 may be scanned. After scanning the first package P1, the first package P1 may be stored. After storing the first package P1, a second package P2 may be scanned. Such a process may continue. In the case of FIG. 7, the first package P1 may be stored in a first slot S1. The second package P2 may be stored in a fourth slot S4. A third package P3 may be stored in a sixth slot S6.

Referring to FIG. 8, the processor 370 may identify the slots in which packages are stored, among the multiple slots S1 to S9, by using the detection data generated by the sensor 330. For example, in the case of FIG. 8, the processor 370 may identify three slots S1, S4, and S6 among the multiple slots S1 to S9, as the slots in which packages are stored.

The processor 370 may match the delivery information DI1 to DI3 of the packages P1 to P3 with the slot information SI1, SI4, and SI6 of the slots S1, S4, and S6 in which the packages P1 to P3 are stored, and may store a result of the matching. According to embodiments, the processor 370 may match the delivery information DI1 to DI3 of the packages P1 to P3 with the slot information SI1, SI4, and SI6, and may store a result of the matching in the memory 350 in the form of a table. For example, in the case of FIG. 8, the first delivery information DI1 of the first package P1 and the first slot information SI1 of the first slot S1 may be stored in a matched manner. The second delivery information DI2 of the second package P2 and the fourth slot information SI4 of the fourth slot S4 may be stored in a matched manner. The third delivery information DI3 of the third package P3 and the sixth slot information SI6 of the sixth slot S6 may be stored in a matched manner.

Referring to FIG. 9, the processor 370 may determine the package to be withdrawn, among the packages stored in the storage unit 310, and may control the notification device 340 so that the notification device 340 provides the notification of the slot in which the package to be withdrawn is stored. According to embodiments, the processor 370 may determine, on the basis of the stored delivery information and the driving information of the delivery vehicle DV, the package to be withdrawn, among the packages stored in the storage unit 310. The processor 370 may determine the slot in which the package to be withdrawn is stored, by using the slot information and the delivery information. The processor 370 may output the notification command for providing the notification of the slot in which the package to be withdrawn is stored.

For example, in the case of FIG. 9, when the delivery destination of the first package P1 is the first delivery destination D1, the processor 370 determines that the package to be withdrawn is the first package P1, on the basis of the driving information of the delivery vehicle DV and the delivery information DI1 to DI3. Afterward, the processor 370 may output, by using the stored delivery information DI1 to DI3 and the stored slot information SI1, SI4, and SI6, a notification command for providing a notification of the first slot S1 in which the first package P1 to be withdrawn is stored. For example, the processor 370 may output the notification command for the first slot S1 by using the first slot information SI1 matched with the first delivery information DI1 of the first package P1. Accordingly, the notification device 340 may provide the notification of the first slot S1. The notification may be provided by visual or auditory means.

According to embodiments of the present disclosure, a notification of the slot in which the package to be withdrawn, among the packages stored in the storage unit 310, is stored is automatically provided, thereby facilitating the withdrawal of the stored packages. For example, even though packages are randomly placed in the storage unit 310, the notification of the slot in which the package to be withdrawn is placed is automatically provided, according to embodiments of the present disclosure. Thus, the worker who withdraws the package can easily identify the package to be withdrawn through the notification, thereby enhancing the efficiency of the withdrawal operation.

Figure 10:
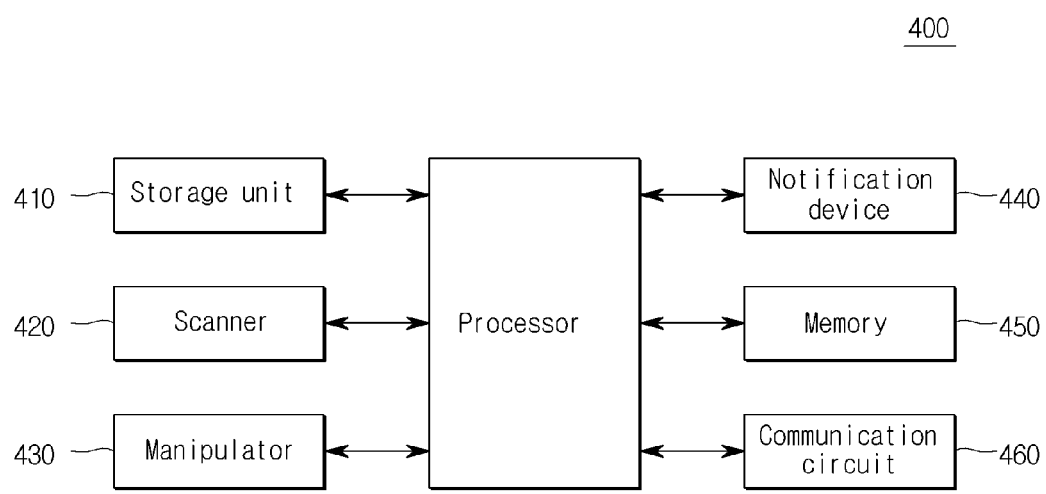
FIG. 10 is a view showing a package storage system according to embodiments of the present disclosure.

FIG. 10 is a view showing a package storage system according to embodiments of the present disclosure. Comparing FIG. 5 and FIG. 10, there is a difference in that a package storage system 400 shown in FIG. 10 includes a manipulator 430 instead of the sensor 330. Unless otherwise stated, it is understood that the package storage system 400 is capable of performing the functions and the operations of the package storage system 300.

A storage unit 410 may include multiple slots that are capable of holding packages therein. According to embodiments, the storage unit 410 may include the configuration of the storage unit 310 and may perform the functions of the storage unit 310.

A scanner 420 may scan the package to be delivered, and may read delivery information of the package to be delivered, according to a result of the scanning. According to embodiments, the scanner 420 may include the configuration of the scanner 320 and may perform the functions of the scanner 320.

The manipulator 430 may be configured to perform storage (loading) and withdrawal of the package P. The manipulator 430 may be configured to perform mechanical operations. According to embodiments, the manipulator 430 may move with six degrees of freedom.

The manipulator 430 may store (or load) the package in the storage unit 410 or may withdraw the package stored in the storage unit 410, according to control by a processor 470. It is understood that the movement of the manipulator 430 described below is performed according to control by the processor 470 unless otherwise specially described.

According to embodiments, the manipulator 430 may store the package in the storage unit 410 according to a storage command transmitted from the processor 470, and may withdraw the package from the storage unit 410 according to a withdrawal command transmitted from the processor 470. For example, the storage command may include the slot information of the slot in which the package is to be stored, and the withdrawal command may include the slot information of the slot from which the package is to be withdrawn.

According to embodiments, the package may be placed on the manipulator 430, and when the package is placed on the manipulator 430, the reading operation by the scanner 420 starts.

A notification device 440 may provide information on the slot in which the package to be delivered is held. According to embodiments, the notification device 440 may include the configuration of the notification device 340 and may perform the functions of the notification device 340.

The memory 450 may store data required for the operation of the package storage system 400. According to embodiments, a memory 450 may include the configuration of the memory 350 and may perform the functions of the memory 350.

A communication circuit 460 may transmit and receive data to/from the external devices. According to embodiments, the communication circuit 460 may include the configuration of the communication circuit 360 and may perform the functions of the communication circuit 360.

The processor 470 may control the overall operations of the package storage system 400. According to embodiments, the processor 470 may include the configuration of the processor 370 and may perform the functions of the processor 370.

The processor 470 may control the manipulator 430. According to embodiments, the processor 470 may store the package in the storage unit 410 or may withdraw the stored package from the storage unit 410, by using the manipulator 430. For example, the processor 470 may move the manipulator 430 to the positions of the respective slots of the storage unit 410, and may store the package in the storage unit 410 or may withdraw the stored package from the storage unit 410, by using the manipulator 430.

According to embodiments, the processor 470 may determine the slot in which the package is to be stored, among the slots of the storage unit 410, may move the manipulator 430 to the determined slot by using the slot information of the determined slot, and may store the package in the determined slot by using the manipulator 430. After storing of the package is completed, the processor 470 may match the slot information of the determined slot with the delivery information of the stored package and may store a result of the matching.

According to embodiments, the processor 470 may determine the package to be withdrawn, and may determine, on the basis of the slot information and the delivery information, the slot in which the package to be withdrawn is stored. The processor 470 may move the manipulator 430 to the slot in which the package to be withdrawn is stored, and may withdraw the package from the slot in which the package to be withdrawn is stored, by using the manipulator 430. When the withdrawal of the package is completed, the processor 470 deletes the stored delivery information that is matched with the slot information. That is, the delivery information matched with the slot information is not present anymore.

The processor 470 may control, on the basis of the coordinates of the slots, a first moving device 433, a rotating device 435, and a second moving device 437 so that a supporting plate 439 approaches the slots. For example, the processor 470 may determine the slot in which the package is to be stored, and may control the first moving device 433, the rotating device 435, and the second moving device 437 so that the supporting plate 439 moves to the position (or the coordinates) of the determined slot.

Figure 11:
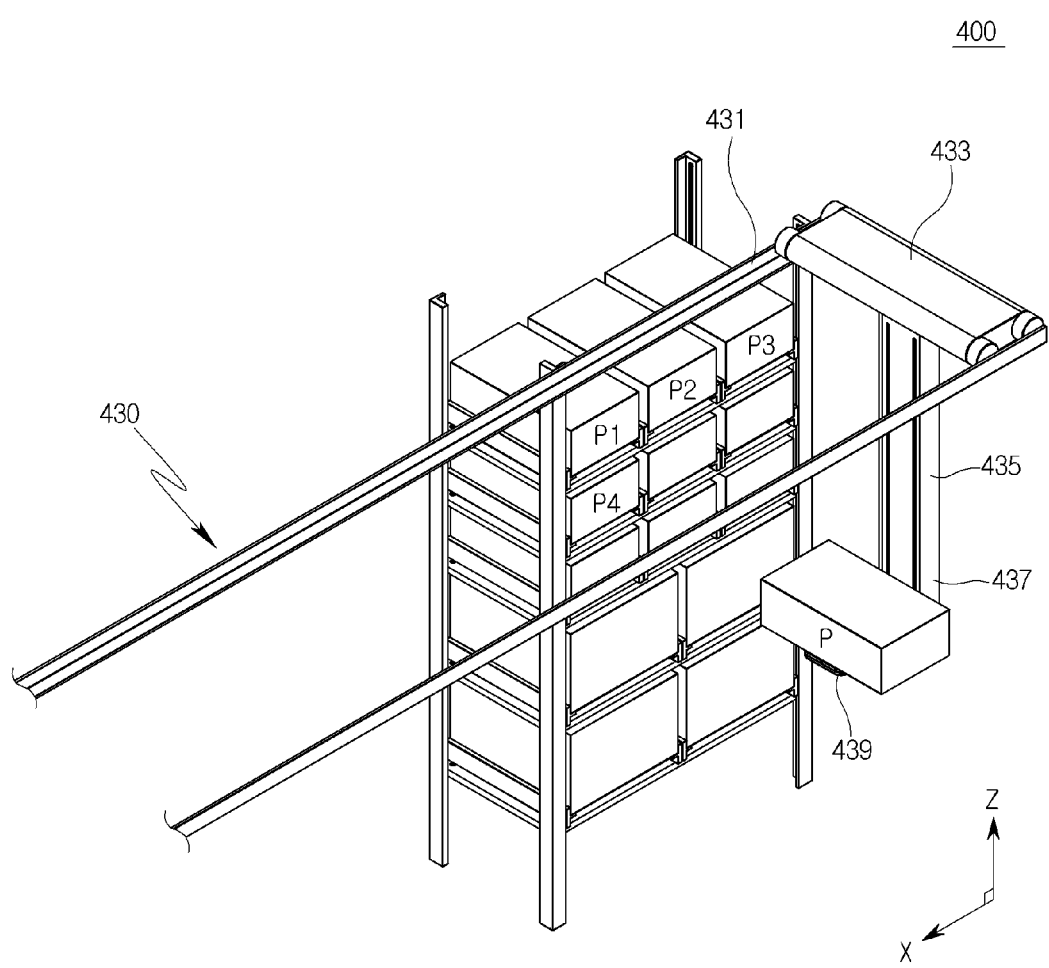
FIG. 11 is a view showing a part of a package storage system according to embodiments of the present disclosure.

FIG. 11 is a view showing a part of a package storage system according to embodiments of the present disclosure. The manipulator 430 may include rails 431, the first moving device 433, the rotating device 435, the second moving device 437, and the supporting plate 439.

The rails 431 may provide a path through which the first moving device 433 may move. According to embodiments, the rails 431 may be attached to the ceiling of the delivery vehicle DV or a side of the storage unit 410. The rails 431 may include a surface on which the first moving device 433 may move. According to embodiments, the rails 431 may be two rails that are spaced apart from each other in parallel by a predetermined distance.

The first moving device 433 may move in a first direction (for example, an X-axis direction) (namely, translational motion). According to embodiments, the first moving device 433 may move in the horizontal direction. For example, the first moving device 433 may move on the surface provided between the rails 431. According to embodiments, the first moving device 433 may move in the first direction on the rails 431 in a manner that slides or rolls on the rails 431. For example, the first moving device 433 may include a roller which performs rotational motion on the rails 431, but it is not limited thereto.

The rotating device 435 may perform rotational motion. According to embodiments, the rotating device 435 may perform rotational motion around the axis of a second direction (for example, a Z-axis direction) that is perpendicular to the first direction. For example, the rotating device 435 may perform rotational motion on the horizontal plane.

The rotating device 435 may be coupled to the first moving device 433. According to embodiments, the rotating device 435 may be attached to the first moving device 433 and may move in the first direction according to the movement of the first moving device 433 in the first direction.

The rotating device 435 may hold the second moving device 437 therein. According to embodiments, the rotating device 435 may include a space into which the second moving device 437 is inserted.

The second moving device 437 may move in the second direction. For example, the second moving device 437 may move in the vertical direction. The second moving device 437 may move along the inside of the rotating device 435. According to embodiments, the second moving device 437 may be an actuator configured to be movable to the inside of the rotating device 435 in an inserted manner. For example, the second moving device 437 may move in the second direction along a rack (or a groove) formed inside the rotating device 435.

At least a part of the second moving device 437 may be fixed into the rotating device 435 in an inserted manner. Accordingly, as the rotating device 435 performs rotational motion, the second moving device 437 may rotate. That is, as the rotating device 435 rotates, the second moving device 437 may rotate around a rotation axis in the second direction.

The supporting plate 439 may support the package P. According to embodiments, the supporting plate 439 may be formed in a manner than extends from the second moving device 437. For example, the supporting plate 439 may extend from an end of the second moving device 437 in a curved manner so that the supporting plate 439 is perpendicular to the second moving device 437. The package P may be placed on the supporting plate 439.

The supporting plate 439 may move in the second direction as the second moving device 437 moves. For example, the supporting plate 439 may move in the vertical direction.

The first moving device 433 may move in the first direction. The rotating device 435 may be attached to the first moving device 433 and may move in the first direction. In addition, the rotating device 435 may rotate around the rotation axis in the second direction. The second moving device 437 may be attached to the rotating device 435 and may move in the first direction and may rotate around the rotation axis in the second direction. In addition, the second moving device 437 may move in the second direction. Accordingly, the supporting plate 439 coupled to the second moving device 437 is movable in both the first direction and the second direction, and is rotatable around the rotation axis in the second direction. Thus, the supporting plate 439 is capable of approaching all the slots of the storage unit 410.

The processor 470 may store the package P placed on the supporting plate 439 in the storage unit 410 or may place the package P stored in the storage unit 410 on the supporting plate 439, by controlling the first moving device 433, the rotating device 435, and the second moving device 437. According to embodiments, the processor 470 may control, on the basis of the coordinates of the slots, the first moving device 433, the rotating device 435, and the second moving device 437 so that the supporting plate 439 approaches the slots. For example, the processor 470 may determine the slot in which the package is to be stored, and may control the first moving device 433, the rotating device 435, and the second moving device 437 so that the supporting plate 439 moves to the position (or the coordinates) of the determined slot.

Figure 12:
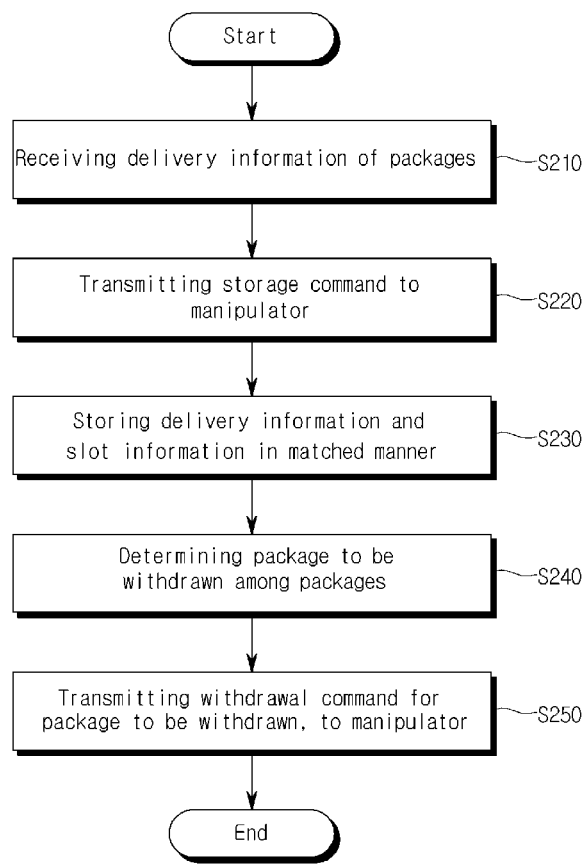
FIG. 12 is a flowchart showing a method of controlling a package storage system according to embodiments of the present disclosure.

FIG. 12 is a flowchart showing a method of controlling a package storage system according to embodiments of the present disclosure. The method shown in FIG. 12 may be performed by the processor 470 of the package storage system 400. In addition, the method may be implemented by instructions executable by a computer. The instructions may be stored in a computer readable storage medium.

Referring to FIG. 12, the processor 470 may receive delivery information of packages at step S210. According to embodiments, the processor 470 may receive the delivery information of the package which is read by the scanner 420.

Before receiving the delivery information, the processor 470 may perform authentication for a user of the package storage system 400. After the authentication is completed, the processor 470 may receive the delivery information of the packages.

The processor 470 may transmit the storage command for storing the package in the storage unit 410, to the manipulator 430 at step S220. According to embodiments, the processor 470 may determine the slot in which the package is to be stored, among the slots of the storage unit 410, and may transmit the storage command including the slot information of the determined slot, to the manipulator 430. The slot information may include the position of the slot. In response to the storage command, the manipulator 430 may perform the operation of storing the package in the slot corresponding to the storage command.

The processor 470 may select (or determine), on the basis of the delivery information of the package, the slot in which the package is to be stored. According to embodiments, the processor 470 may determine the slot in which the package is to be stored, on the basis of the size of the package, the delivery destination of the package, the type of the package, or the like. For example, the processor 470 may select the slot corresponding to the size of the package; may select the slot, wherein the heavier the package is, the lower the position of the slot storing the package is; or may select the slot, wherein the farther the delivery destination of the package is, the more outward the slot storing the package is positioned in the storage unit 410. However, this is just an example, and embodiments of the present disclosure are not limited thereto.

The processor 470 may match the delivery information of the package with the slot information and may store a result of the matching, at step S230. According to embodiments, the processor 470 may match the delivery information of the package with the slot information of the slot in which the package is stored, and may store a result of the matching in the memory 450. For example, the processor 470 may store the delivery information of the package as an index of the slot information or may store the slot information as an index of the delivery information of the package.

The processor 470 may determine the package to be withdrawn, among the packages stored in the storage unit 410, at step S240. According to embodiments, the processor 470 may determine the package to be withdrawn (product to be withdrawn) among the stored packages, by using the driving information of the delivery vehicle DV and the delivery information of the package.

The processor 470 may transmit the withdrawal command for withdrawing the package to be withdrawn, to the manipulator 430 at step S250. According to embodiments, the processor 470 may transmit the storage command including the slot information of the slot in which the determined package to be withdrawn is stored, to the manipulator 430. The slot information may include the position of the slot. In response to the withdrawal command, the manipulator 430 may perform the operation of withdrawing the package stored in the slot corresponding to the withdrawal command.

According to embodiments of the present disclosure, packages are automatically stored in the storage unit 410, and the package to be withdrawn among the packages stored in the storage unit 410 is automatically withdrawn from the storage unit, thereby facilitating storage of the packages to be stored and the withdrawal of the stored packages. In particular, while the storage unit 410 is moved by the delivery vehicle DV, the package to be withdrawn among the stored packages is automatically withdrawn from the storage unit on the basis of the driving information of the delivery vehicle DV, thereby facilitating delivery of the packages.

The method according to embodiments of the present disclosure may be stored in a computer readable storage medium so as to be employed in commands executable by the processor.

The storage medium can include a database, including distributed database, such as a relational database, a non-relational database, an in-memory database, or other suitable databases, which can store data and allow access to such data via a storage controller, whether directly and/or indirectly, whether in a raw state, a formatted state, an organized stated, or any other accessible state. In addition, the storage medium can include any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium.

Although some embodiments have been disclosed above, it should be understood that these embodiments are given by way of illustration only, and that various modifications, variations, and alterations can be made without departing from the spirit and scope of the present disclosure. Therefore, the scope of the present disclosure should be limited only by the accompanying claims and equivalents thereof.

Accordingly, the present disclosure has been made keeping in mind the above problems occurring in the related art, and the present disclosure is intended to provide a package storage system and a method of controlling the package storage system, wherein a process of delivering the package to a recipient via a delivery vehicle is convenient and simplified.

According to embodiments of the present disclosure, there is provided a method of controlling a package storage system including a storage unit that is loaded in a delivery vehicle and stores one or more packages, the method including: receiving delivery information of the packages from a scanner; storing slot information of slots in which the packages are stored and the delivery information of the packages, in a matched manner; determining, on the basis of the delivery information and driving information of the delivery vehicle, the package to be withdrawn among the packages; and outputting, on the basis of the delivery information and the slot information, a notification command for providing a notification of the slot in which the package to be withdrawn is stored.

According to embodiments of the present disclosure, there is provided a package storage system including: a storage unit configured to be loaded in a delivery vehicle, and to include multiple slots for storing packages; a scanner configured to perform reading to acquire delivery information of the packages; a processor configured to provide a notification of the slot in which the package to be withdrawn among the packages is stored; and a memory, wherein the processor receives the delivery information from the scanner; stores slot information of the slots in which the packages are stored and delivery information of the packages, in a matched manner, in the memory; determines, on the basis of the delivery information and driving information of the delivery vehicle, the package to be withdrawn; and identifies, on the basis of the slot information and the delivery information that are stored in a matched manner, the slot in which the package to be withdrawn is stored.

According to embodiments of the present disclosure, there is provided a control device for controlling a package storage system including a storage unit that is loaded in a delivery vehicle and stores one or more packages, the control device including: a processor, wherein the processor receives delivery information of the packages to be stored in the storage unit; stores slot information of slots in which the packages are stored, among multiple slots of the storage unit, and the delivery information of the packages, in a matched manner; determines, on the basis of the delivery information and driving information of the delivery vehicle, the package to be withdrawn among the packages; and outputs, to the package storage system on the basis of the delivery information and the slot information, a notification command for providing a notification of the slot in which the package to be withdrawn is stored.

According to embodiments of the present disclosure, the notification of the slot in which the package to be withdrawn, among the packages stored in the storage unit, is stored is automatically provided, thereby facilitating the withdrawal of the stored packages.

According to embodiments of the present disclosure, packages are automatically stored in the storage unit, and the package to be withdrawn among the packages stored in the storage unit is automatically withdrawn, thereby facilitating storage of the packages to be stored and the withdrawal of the stored packages.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A delivery method based on a package storage system to be provided on a delivery vehicle, the package storage system comprising a storage unit having a plurality of slots for storing a plurality of packages, a scanner, a processor and a memory, the method comprising:
    receiving, from the scanner, delivery information of the packages;
    storing, in a matched manner, slot information of the slots in which the packages are stored and the delivery information of the packages, in the memory;
    determining, based on the delivery information and driving information of the delivery vehicle, a specific package to be withdrawn from among the plurality of packages; and
    outputting, based on the delivery information and the slot information, a notification to identify the slot that stores the specific package to be withdrawn,
    wherein the method further comprises identifying the slots in which the packages are stored, from among the plurality of slots, based on detection data obtained from a sensor.

2. The method of claim 1, further comprising:
    performing authentication for a user who uses the package storage system; and
    receiving the delivery information according to a result of the authentication.

3. The method of claim 1, wherein the storing, in the matched manner, of the slot information and the delivery information includes:
    storing the delivery information and the corresponding slot information such that the slot information of the slot that stores the specific package is determined based on the delivery information or such that the delivery information of the specific package stored in the slot is determined based on the slot information.

4. The method of claim 1, wherein the sensor includes at least one of:
    an image sensor configured to provide an image of the slots;
    a proximity sensor configured to detect presence of an object inside the slots; and
    a weight sensor configured to measure a weight of an object inside the slots.

5. The method of claim 1, wherein the identifying of the slots include:
    receiving, from the sensor, first detection data with respect to the storage unit at a first time point;
    receiving, from the sensor, second detection data with respect to the storage unit at a second time point; and
    identifying, based on the first detection data and the second detection data, the slot in which the specific package is stored, from among the plurality of slots.

6. The method of claim 1, wherein the determining of the specific package to be withdrawn includes:
    determining, as the specific package to be withdrawn, the package having a delivery destination that is located within a reference range from a current position of the delivery vehicle, from among the stored packages.

7. The method of claim 1, wherein the determining of the specific package to be withdrawn includes:
    determining, as the specific package to be withdrawn, the package in which an estimated arrival time to a delivery destination is within a reference time, from among the stored packages.

8. The method of claim 1, wherein the outputting of the notification includes:
    determining, based on the stored delivery information and the slot information, the slot that stores the specific package to be withdrawn, from among the plurality of slots.

9. The method of claim 1, further comprising:
    transmitting a storage command for storing the packages, to a manipulator configured to perform mechanical operations; and
    transmitting, to the manipulator, a withdrawal command for withdrawing the specific package to be withdrawn.

10. The method of claim 9, wherein the transmitting of the withdrawal command includes:
    determining, based on the stored delivery information and the slot information, the slot that stores the specific package to be withdrawn, from among the plurality of slots; and
    transmitting the withdrawal command that includes the slot information of the slot that stores the specific package to be withdrawn.

11. A package storage system to be provided on a delivery vehicle, comprising:
    a storage unit configured to have a plurality of slots for storing a plurality of packages;
    a scanner configured to acquire delivery information of the packages;
    a sensor configured to provide detection data with respect to the storage unit,
    a processor configured to provide a notification of the slot; and
    a memory,
    wherein the processor is configured to:
        receive, from the scanner, the delivery information of the plurality of packages;
        identify the slots in which the packages are stored, from among the plurality of slots, based on the detection data;
        store, in a matched manner, slot information of the slots that store the packages and delivery information of the packages, in the memory;

determine, based on the delivery information and driving information of the delivery vehicle, a specific package to be withdrawn from among the plurality of packages; and output, based on the slot information and the delivery information, a notification to identify the slot that stores the specific package to be withdrawn.

12. The package storage system of claim 11, wherein the processor is configured to store, in the memory, the delivery information and the corresponding slot information such that the slot information of the slot that stores the specific package is determined based on the delivery information or such that the delivery information of the specific package stored in the slot is determined based on the slot information.

13. The package storage system of claim 11, wherein the sensor includes at least one of:
an image sensor configured to provide an image of the slots;
a proximity sensor configured to detect presence of an object inside the slots; and
a weight sensor configured to measure a weight of an object inside the slots.

14. The package storage system of claim 11, further comprising:
a manipulator configured to perform mechanical operations,
wherein the processor is configured to transmit, to the manipulator, a storage command for storing the packages, and to transmit, to the manipulator, a withdrawal command for withdrawing the specific package to be withdrawn.

15. A control device for controlling a package storage system to be provided on a delivery vehicle, the package storage system comprising a storage unit having a plurality of slots for storing a plurality of packages, the control device comprising:
a processor configured to:
receive delivery information of the packages to be stored in the plurality of slots;
identify the slots in which the packages are stored, from among the plurality of slots, based on detection data provided by a sensor;
store, in a matched manner, slot information of the slots in which the packages are stored and the delivery information of the packages;
determine, based on the delivery information and driving information of the delivery vehicle, a specific package to be withdrawn from among the plurality of packages; and
output, based on the delivery information and the slot information, a notification to identify the slot that stores the specific package to be withdrawn.

16. The control device of claim 15, wherein the processor is configured to determine, based on stored delivery information and the slot information, the slot that stores the specific package to be withdrawn, from among the plurality of slots.

17. The control device of claim 15, wherein the processor is configured to store the delivery information and the corresponding slot information such that the slot information of the slot that stores the specific package is determined based on the delivery information.

18. The control device of claim 15, wherein the processor is configured to store the delivery information and the corresponding slot information such that the delivery information of the specific package stored in the slot is determined based on the slot information.

* * * * *